United States Patent
Geyer et al.

(10) Patent No.: US 6,474,868 B2
(45) Date of Patent: Nov. 5, 2002

(54) ROLLER BEARING FOR LONGITUDINAL MOTIONS

(75) Inventors: Andreas Geyer, Unterspiesheim (DE); Erwin Jeschka, Schweinfurt (DE); Uwe Mayer, Münnerstadt (DE); Erwin Stahl, Rottershausen (DE); Henryk Velde, Werneck (DE); Eric Baudez, Montigny le Bretonneux (FR); Benoit Duval, Vendome (FR); André Laisement, La Chapelle-Encherie (FR); Manuel Antonio Onteniente, Barcelona (ES)

(73) Assignees: SKF Linearsysteme GmbH, Schweinfurt (DE); Nacam France S.A., Vendome (FR)

( * ) Notice: Subject to any disclaimer, the term of this patent is extended or adjusted under 35 U.S.C. 154(b) by 33 days.

(21) Appl. No.: 09/731,927

(22) Filed: Dec. 8, 2000

(65) Prior Publication Data

US 2001/0006564 A1 Jul. 5, 2001

(30) Foreign Application Priority Data

Dec. 10, 1999 (EP) .............................................. 99124613

(51) Int. Cl.[7] .............................................. F16C 29/04
(52) U.S. Cl. ......................................... 384/49; 464/167
(58) Field of Search ............................. 384/43, 45, 49; 464/167, 168; 74/492, 493

(56) References Cited

U.S. PATENT DOCUMENTS

| 3,933,396 A | * | 1/1976 | Nilsson ....................... 384/43 |
| 4,005,913 A | | 2/1977 | Thomson, Jr. ............... 384/43 |
| 4,128,278 A | | 12/1978 | Headen et al. ................ 384/43 |
| 4,227,751 A | | 10/1980 | Albert .......................... 384/43 |
| 4,433,875 A | * | 2/1984 | Walter et al. ................. 384/49 |
| 4,482,338 A | * | 11/1984 | Walter et al. ............... 464/167 |
| 4,898,566 A | * | 2/1990 | Hakansson .................. 464/167 |
| 4,952,075 A | | 8/1990 | Rogers, III .................. 384/43 |
| 5,584,765 A | | 12/1996 | Ochiai ........................ 464/168 |

FOREIGN PATENT DOCUMENTS

| DE | 81 24 025 | 11/1981 |
| GB | 2 100 365 | 12/1982 |

* cited by examiner

Primary Examiner—Thomas R. Hannon
(74) Attorney, Agent, or Firm—Burns, Doane, Swecker & Mathis, L.L.P.

(57) ABSTRACT

A roller bearing for longitudinal motion includes a sleeve part through which passes a guide rod, a plurality of preferably uniformly distributed race plates each disposed in a respective receptacle formed in either the sleeve part or the guide rod, and a plurality of roller bodies disposed between the race plates and the guide rod. To compensate in a simple way for production variations, a spring mechanism is operatively associated with at least one of the race plates.

20 Claims, 5 Drawing Sheets

ROLLER BEARING FOR LONGITUDINAL MOTIONS

This application is based on and claims priority under 35 U.S.C. § 119 with respect to European Application No. EP 99 124 613.3 filed on Dec. 10, 1999, the entire content of which is incorporated herein by reference.

FIELD OF THE INVENTION

This invention generally relates to roller bearings. More particularly, the present invention pertains to roller bearings for longitudinal motion.

BACKGROUND OF THE INVENTION

Roller bearings for permitting longitudinal movement are known in the art. German Utility Model DE 81 24 026 U1 describes a torque-transmitting bearing for longitudinal motions in which at least one race plate is fixed in a radially adjustable manner in a housing bore. To avoid the need for intervention into the housing, the race plate has axially extending cutting edges. When the bearing is press-fitted in place, these cutting edges dig into the face of the bore in the housing. The race plate can thus be aligned with the race of the shaft.

A similar roller bearing is known from German Utility Model DE 81 24 025 U1. To prevent mistakes during installation, caused by production variations and imprecision, from adversely affecting the running or operating properties of the roller bearing, this document describes that when the race plates are being positioned, an annular blade disposed on the face end of the housing screw digs into a plastically deformable inlay of the race plate. This enables the race plate to align itself automatically.

With these known types of linear guides, it can thus be assured that the race plates will become solidly fixed in a desired position upon installation of the linear bearing. Certain production variations can be eliminated as a result. However, a disadvantage of the previously known versions is that this kind of bearing composite can react only slightly, if at all, to altered kinematic conditions, such as if during operating conditions the relative direction of rotation between the sleeve part and the guide rod changes constantly. Such a situation is relatively typical, for instance, in the linear bearing guide of the steering column of a motor vehicle.

A need thus exists for a roller bearing for longitudinal motions in which a flexible reaction in terms of the position of the race plates is assured even if the direction of rotation of the guide rod relative to the sleeve part changes constantly, with production variations nevertheless remaining without adverse effect within a certain scope.

A need also exists for a longitudinal motion roller bearing that addresses the foregoing while at the same time assuring that the guidance property of the linear bearing remains relatively unchanged even after long use, with material fatigue not having any significant adverse effect on the guidance precision of the bearing.

SUMMARY OF THE INVENTION

In accordance with one aspect of the invention, a roller bearing for longitudinal motion includes a sleeve part provided with a bore and a plurality of uniformly distributed receptacles formed in the inner surface of the sleeve part, a guide rod positioned in the bore in the sleeve part, a plurality of race plates each disposed in one of the receptacles in the sleeve part, a plurality of roller bodies disposed between the race plates and the guide rod, and a spring mechanism operatively associated with at least one of the race plates to provide a spring force acting on the at least one race plate.

The spring mechanism helps ensure that the roller bodies are always pressed into their assigned position with a constant force, namely the spring force associated with the spring mechanism, so that the roller bearing is relatively invulnerable to production variations that systematically can never be entirely avoided with respect to the individual components of the bearing. As a result, a relatively inexpensive production of the bearing can be achieved. Also, fatigue effects in the individual components of the bearing do not play a major role because the spring mechanism can counteract the yielding of individual elements. Further, even if the direction of rotation of the motion between the guide rod and the sleeve part reverses itself constantly or continually, relatively little or no loss of precision takes place because the spring mechanism generally always ensures constant rolling conditions.

The race plates can be sized or configured to provide play in relation to the receptacles receiving them. As a result, the spring mechanism according to the invention can come into play especially efficiently.

The spring mechanism preferably acts in the radial direction of the sleeve part. In addition or as an alternative, the spring mechanism can act in the lateral or somewhat circumferential direction of the sleeve part.

It is envisioned that the receptacles receiving the race plates can be formed in the outer surface of the guide rod rather than being formed in the inner surface of the sleeve part.

The spring property associated with the spring mechanism can be integrated directly into the race plate. For example, the spring mechanism can be embodied integrally with the respective race plate by virtue of, for example, the material forming the race plate. For this reason, the race plate can be given a special form, designed such that yielding or sagging of the race plate occurs under load, so that the plate develops a certain spring action.

The spring mechanism can also be in the form of a spring mechanism that is separate from the race plate and placed between the race plate and the sleeve part (or the guide rod when the receptacles are formed in the guide rod). To that end, it is preferable that the spring mechanism be placed in a chamber formed between the receptacle for the race plate in the sleeve part or in the guide rod and the race plate itself. The race plate can also be provided with its own recess or receptacle which forms the chamber for the spring mechanism.

As the spring mechanism, wavy or undulating metal parts, in particular spring metal strips, are quite useful. Also, the spring mechanism can be operatively associated with only one race plate, or a few race plates.

According to another aspect of the invention, a roller bearing for longitudinal motions includes a sleeve part provided with a bore, a guide rod positioned in the bore in the sleeve part and including a plurality of uniformly distributed receptacles formed in the outer surface of the guide rod, a plurality of race plates each disposed in one of the receptacles in the guide rod, a plurality of roller bodies disposed between the race plates and the sleeve part, and a spring mechanism operatively associated with at least one of the race plates to provide a spring force acting on the at least one race plate.

According to another aspect of the invention, a roller bearing for longitudinal motions includes a sleeve part provided with a bore, a guide rod positioned in the bore in the sleeve part, a plurality of uniformly distributed receptacles formed in either the outer surface of the guide rod or the inner surface of the sleeve part, a plurality of race plates each disposed in one of the receptacles, a plurality of roller bodies positioned between the guide rod and the sleeve part, and a spring element positioned between at least one of the race plates and the receptacle in which the at least one race plate is disposed to apply a spring force to the race plate urging the race plate in a radial direction away from the closed end wall of the receptacle.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
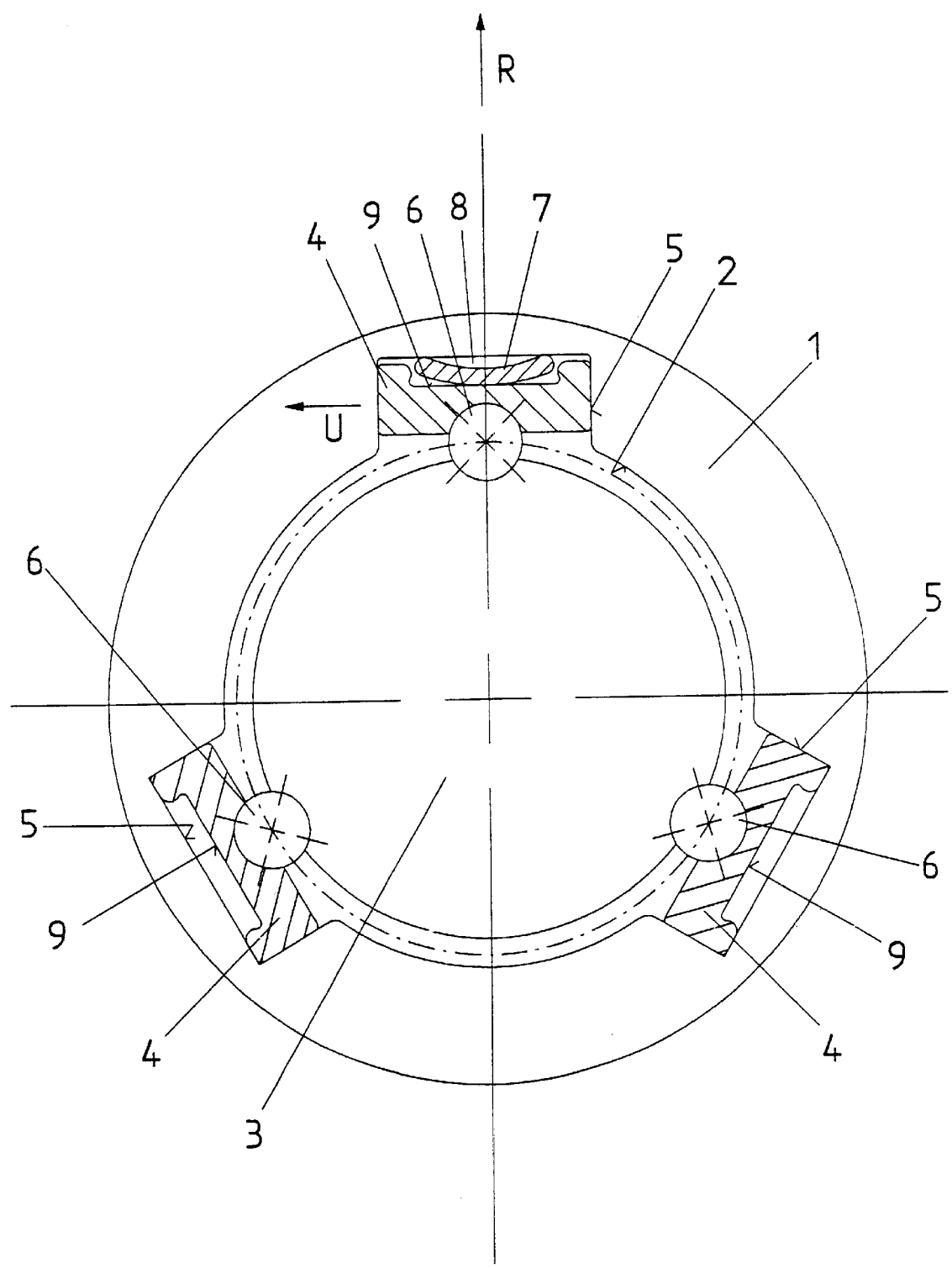
FIG. 1 is a cross-sectional view through a linear bearing in accordance with a first embodiment of the present invention.

Referring initially to FIG. 1 which illustrates a cross-sectional view through a sleeve part 1 of a linear bearing or longitudinal movement bearing according to the present invention, the sleeve part 1 has a longitudinally extending bore 2 through which a guide rod 3 passes. Both the sleeve part 1, including the inner surface of the bore 2 in the sleeve part 1, and the guide rod 3 possess a substantially cylindrical cross-section. To support the guide rod 3 relative to the sleeve part 1, a plurality of spaced apart receptacles 5 are machined into the interior surface of the sleeve part 1, and a race plate 4 is positioned in each of the receptacles 4. The race plates 4 can be sized and configured so that some play exists between the race plates 4 and the respective receptacle 5 in which the race plates 4 are received.

Each of the race plates 4 is provided with a ground race in which rolling bodies 6 (e.g., balls) are located. In addition, races are ground into the outer surface of the guide rod 3 for also receiving the rolling bodies 6. The rolling bodies are this positioned between the sleeve part 1 and the guide rod 3. The number of races in the outer surface of the guide rod 3 is preferably equal to the number of race plates 4 as well as the number of races in the race plates. As an alternative to grinding, it is possible to manufacture the race plates 4 by cold drawing or cold rolling, for instance.

In the illustrated embodiment, the three race plates 4 (and the race in each race plate) are distributed at equal angular intervals over the inner circumference of the bore 2 in the sleeve so that adjacent race plates are offset from one another by 120°. Similarly, the races in the outer circumference of the guide shaft 3 are distributed at equal angular intervals over the outer circumference of the guide rod 3 so that adjacent races are offset from one another by 120°.

To impart relatively precise guidance properties to the bearing, a spring mechanism in the form of a spring element 7 is positioned between the upper race plate 4 and the respective receptacle 5 in which the upper race plate 4 is positioned. This spring element 7 produces a biasing force acting in the radial direction R of the sleeve part 1. The effect of the spring force associated with the spring element 7 is that the upper race plate 4 is pressed away from the receptacle 5 in the outer radial direction generally designated as R in FIG. 1. As a result, a prestressing force is exerted on the entire linear bearing, that is on all three guide paths, so that variations between the sleeve part 1, the guide rod 3 and the receptacles 5 associated with production tolerances are addressed or substantially eliminated. Despite such production variations, a clean linear guidance can be achieved As shown in FIG. 1, it is not absolutely necessary to position a spring element 7 in the two lower race plates 4 and the respective receptacles in which those lower race plates are located. However, it is to be understood that a spring can be positioned at such locations.

The spring element 7 placed in the region of the upper race plate 4 is disposed in a chamber 8 which is intended especially for receiving the spring. The chamber 8 is defined on the one hand by the receptacle 5 (wall of the receptacle) that receives the race plate 4 and on the other by a receptacle or recess 9 which is machined into the surface of the race plate 4 that faces the closed bottom end wall of the receptacle 5.

Figure 2:
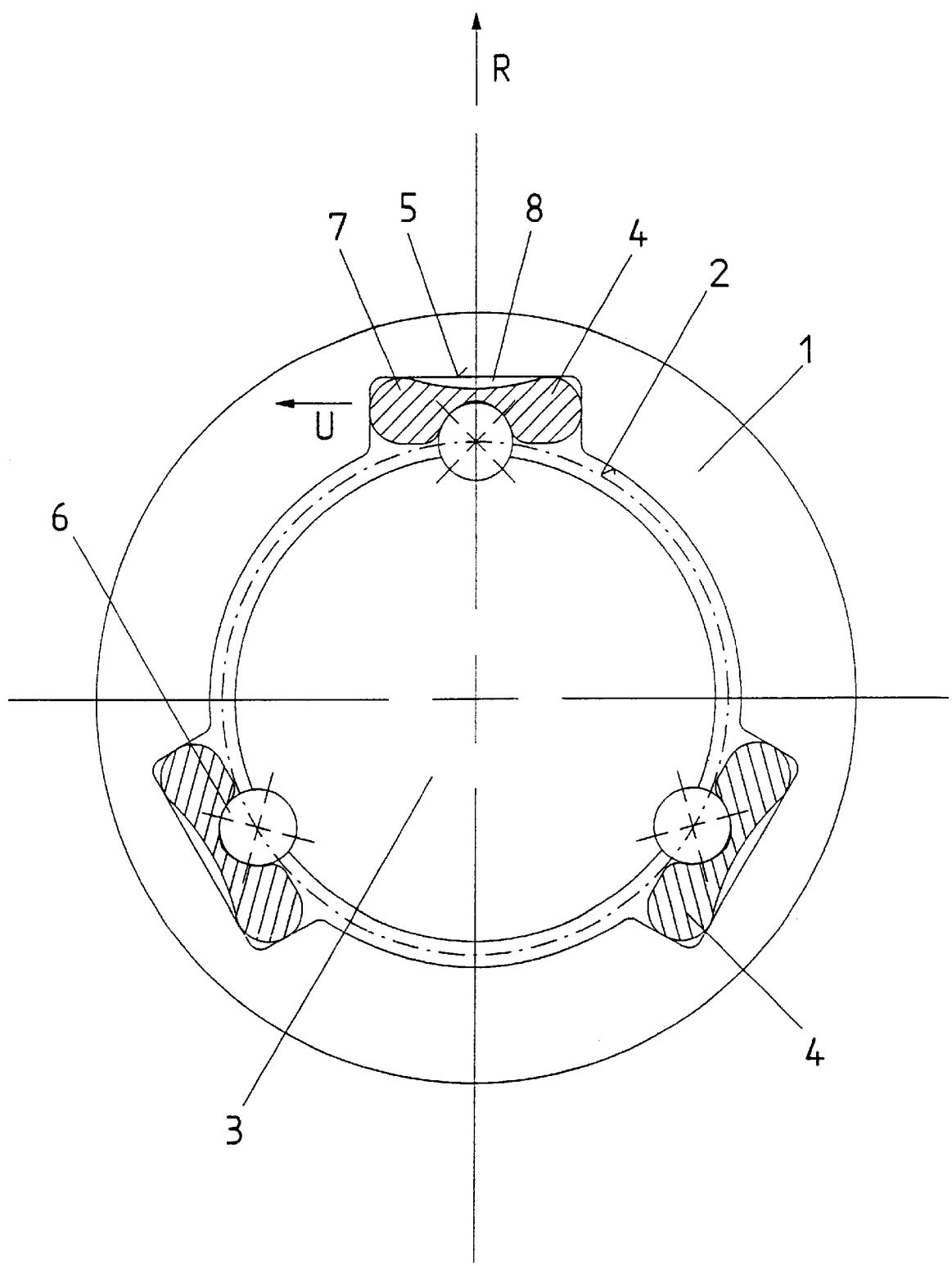
FIG. 2 is a cross-sectional view through a linear bearing in accordance with a second embodiment of the present invention.

FIG. 2 illustrates an alternative embodiment of the longitudinal motion or linear bearing of the present invention. In this version of the present invention, the spring mechanism 7 in the form of a separate spring element is eliminated. Instead, the spring mechanism is provided by the race plates 4 themselves, with the race plates 4 being configured, shaped and made of a material such that upon assembly of the bearing arrangement, the race plates 4 sag, yield or bend slightly as illustrated in FIG. 2. As a result, a spring force is exerted with respect to each race plate 4. It can thus be seen that in this embodiment, a spring-type force is associated with not just the top race plate 4, but indeed all of the race plates 4, although it is to be understood that the spring-type effect or spring mechanism associated with the shape, configuration and material of the race plate 4 need only be applied to the top race plate 4. The spring-type force can be directed in both the radial direction R as well as the lateral direction U. As in the embodiment of the invention shown in FIG. 1, rolling bodies 6 (e.g., balls) are positioned between the guide rod 3 and the sleeve part 1, specifically between the race plate 4 and the guide rod 3. This embodiment of the present invention is particularly useful in that advantages similar to those described above can be realized in a particularly simple way.

Figure 3:
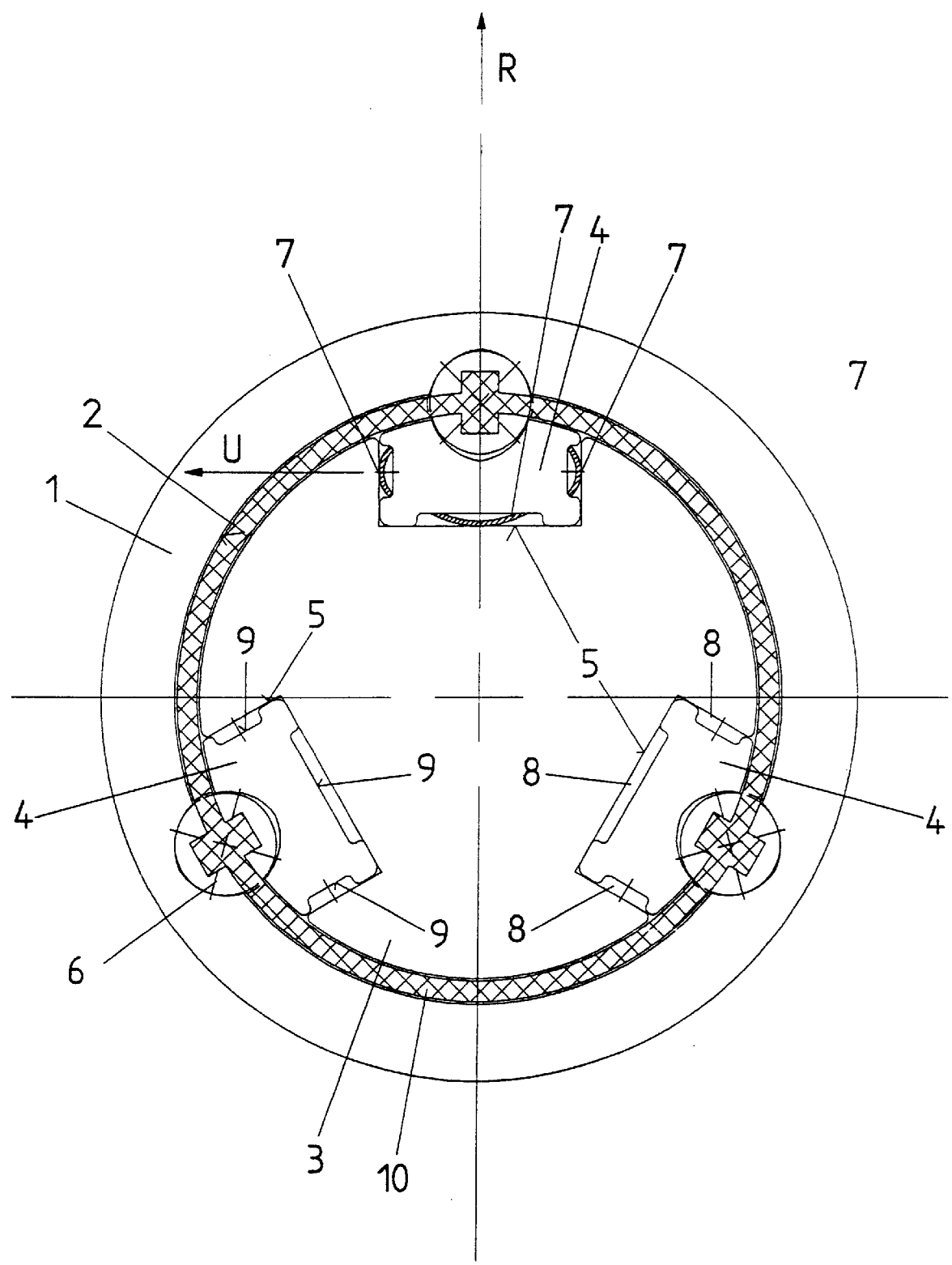
FIG. 3 is a cross-sectional view through a linear bearing in accordance with a third embodiment of the present invention.

FIG. 3 illustrates a still further alternative version of the present invention. In this version of the present invention, rather than the receptacles 5 for the race plates 4 being machined into the sleeve part 1, the receptacles 5 for receiving the race plates 4 are machined into the outer surface of the guide rod 3. Once again, the race plates 4 can be sized and configured so that some play exists between the race plates 4 and the respective receptacle 5 in which the race plates 4 are received.

As can be clearly seen from FIG. 3, a spring mechanism in the form of a spring element 7 is once again positioned between the closed bottom wall of the top receptacle 5 and the race plate 4 to urge the race plate 4 radially outwardly. A recess is provided in the race plate 4 to receive the spring 7. In addition, a spring mechanism in the form of laterally disposed spring elements 7 which act in the lateral or somewhat circumferential direction U of the sleeve part 1 are positioned between each side wall of the top receptacle 5 and the facing sides of the race plate 4. The spring elements 7 are located in corresponding receiving chambers 8 between the race plate 4 and the guide rod 3. In the illustrated embodiment, the chambers 8 are formed by recesses or receptacles 9 formed in the sides of the race plate 4. As in the FIG. 1 embodiment described above, only the upper race plate 4 is provided with the spring elements 7, 7, while the two lower plates are mounted without such spring elements. The spring force exerted by the spring elements 7, 7 disposed in the upper race plate 4 will typically suffice to compensate for the production variations of the overall bearing. However, it is to be understood that as an alternative, it is also possible for similar spring elements 7 to be disposed in corresponding chambers 8 of the two lower race plates to provide radial spring forces and lateral spring forces. For reasons of production economy, the lower race plates 4 preferably also have the corresponding recesses or receptacles 9, even if they are not actually needed. In this way, only one type of race plate is required, regardless of whether spring elements 7, 7 are used in connection with all of the race plates 4.

FIG. 3 also illustrates a cage 10 between the sleeve part 1 and the guide rod 3 for guiding the roller bodies or balls in a known way. In addition, rolling bodies 6 (e.g., balls) are positioned between the guide rod 3 and the sleeve part 1, specifically between the race plate 4 and the sleeve part 1.

Figure 4:
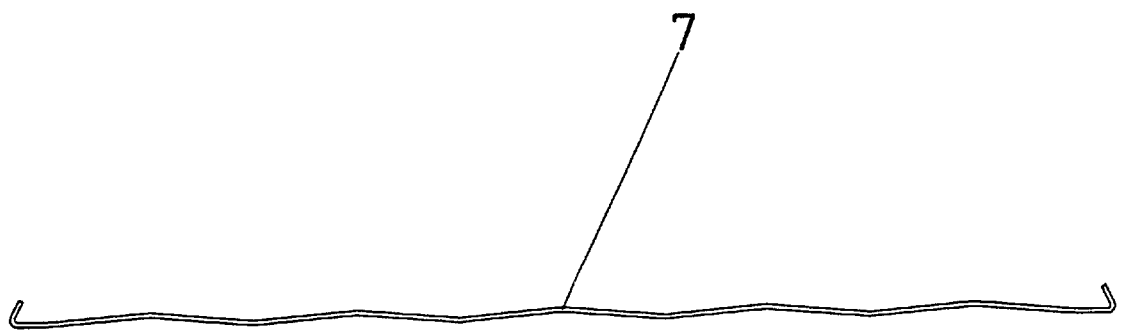
FIG. 4 is an illustration of a spring element used in the linear bearing s o f the present invention for generating spring properties in the radial direction of the sleeve part.
Figure 5:
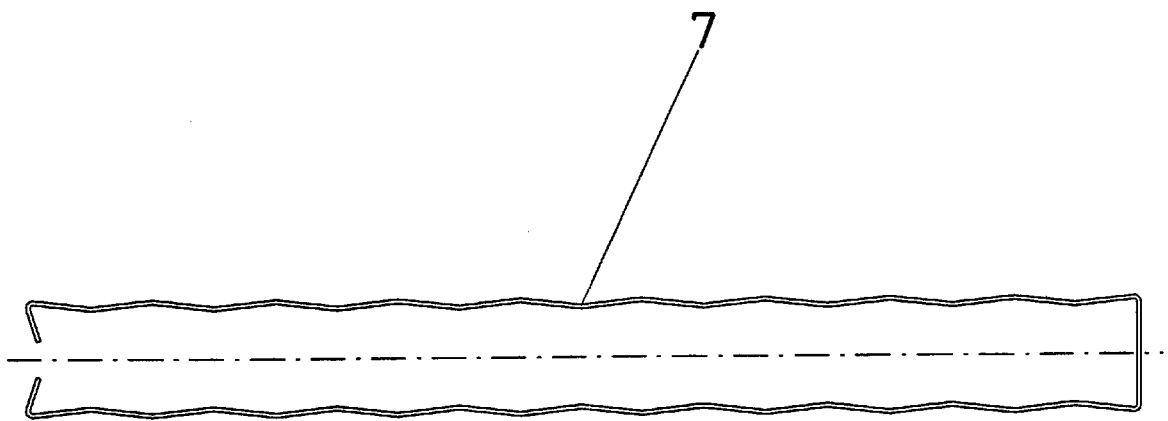
FIG. 5 is an illustration of another spring element used in the linear bearings of the present invention for producing a spring property in the circumferential direction of the sleeve part.

The present invention can be implemented in a particularly economical and functional manner by using spring elements 7 of the kind seen in FIGS. 4 and 5. Here, the spring elements 7 comprise a spring steel band embodying a wavy or undulating configuration as is clearly seen from FIGS. 4 and 5. The wavy or undulating configuration of the spring provides somewhat generally angled regions extending out of the longitudinal plane of the spring. Upon assembling the bearing unit, the spring element or spring elements 7 are placed in the corresponding recesses 9 in the race plates 4 defining the chambers 8, and the thus equipped race plates 4 are installed in the appropriate receptacle 5. By virtue of the compression applied to the combination of the race plate and the spring in the receptacle, the somewhat angled regions of the spring elements 7 are urged towards a more flattened state, thereby generating the spring force. A spring element 7 of the kind shown in FIG. 4 is preferably located in the chamber 8 that generates the spring force in the radial direction R of the sleeve part 1.

The spring element 7 shown in FIG. 5 is embodied as a clip which is adapted to fit around the race plate 4 in such a way that the spring element 7 engages the two lateral recesses 9 defining the lateral receiving chambers 8. As a result, by virtue of the spring element 7 shown in FIG. 4 and the spring element or spring clip 7 shown in FIG. 5, all three recesses in the race plate that define the chambers 8 are equipped with spring elements. Alternatively, it is also possible to manufacture the several springs associated with each race plate as an integral component which is inserted, by being fitted around the race plate 4 from three sides, onto the race plate 4.

It is to be noted that the spring mechanism shown in FIG. 2, in which the spring force or biasing force is provided by the race plate 4 itself, can also be applied as an alternative to the spring mechanism shown in FIG. 3. Thus, the race plate 4 shown in FIG. 2 can be positioned in a receptacle formed in the guide rod 3. In addition, as noted above, the version of the present invention shown in FIG. 1 can be provided with a spring mechanism similar to that shown in FIG. 3 that imparts lateral spring forces to the race plates 4.

By virtue of the present invention, an especially high precision in the manufacture of the individual components of the bearing is no longer necessary, yet a precise bearing can be realized by virtue of the prestressing provided by the spring mechanism. Even if the direction of rotation between the guide rod and the sleeve part is continually reversed, good bearing properties are preserved even over the long term. This attribute is particularly advantageous wherever the bearings are used in linear rolling guides in, for example, the steering columns of passenger cars.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roller bearing for longitudinal motion, comprising:
   a sleeve part provided with a bore and possessing an inner surface, the sleeve part including a plurality of uniformly distributed receptacles formed in the inner surface of the sleeve part;
   a guide rod with a circular cross-section positioned in the bore in the sleeve part;
   a plurality of race plates each disposed in one of the receptacles in the sleeve part, the plurality of race plates being unconnected to one another;
   a plurality of roller bodies disposed between the race plates and the guide rod; and
   a spring mechanism operatively associated with at least one of the race plates to provide a spring force acting on the at least one race plate.

2. The roller bearing according to claim 1, wherein each race plate is sized relative to the respective receptacle in which the race plate is positioned so that play exists between the race plate and the respective receptacle.

3. The roller bearing according to claim 1, wherein the spring mechanism acts in a radial direction of the sleeve part.

4. The roller bearing according to claim 1, wherein the spring mechanism acts in a lateral direction of the sleeve part.

5. The roller bearing according to claim 1, wherein the spring mechanism is embodied integrally in the at least one race plate and is comprised of the material forming the race plate.

6. The roller bearing according to claim 1, wherein the spring mechanism is located in a chamber formed between the at least one race plate and the receptacle in the sleeve part in which the at least one race plate is positioned.

7. The roller bearing according to claim 1, wherein the spring mechanism is located in a chamber formed by the receptacle in the sleeve part in which the at least one race plate is positioned and a recess in the at least one race plate.

8. The roller bearing according to claim 1, wherein the spring mechanism is a spring metal strip.

9. The roller bearing according to claim 1, wherein the spring mechanism is operatively associated with only one of the race plates.

10. A roller bearing for longitudinal motions, comprising:
    a sleeve part provided with a bore;
    a guide rod positioned in the bore in the sleeve part, the guide rod including a plurality of uniformly distributed receptacles formed in an outer surface of the guide rod;
    a plurality of race plates each disposed in one of the receptacles in the guide rod;
    a plurality of roller bodies disposed between the race plates and the sleeve part; and
    a spring mechanism operatively associated with at least one of the race plates to provide a spring force acting on the at least one race plate.

11. The roller bearing according to claim 10, wherein each race plate is sized relative to the respective receptacle in which the race plate is positioned so that play exists between the race plate and the respective receptacle.

12. The roller bearing according to claim 10, wherein the spring mechanism acts in a radial direction of the guide rod.

13. The roller bearing according to claim 10, wherein the spring mechanism acts in a lateral direction of the guide rod.

14. The roller bearing according to claim 10, wherein the spring mechanism is embodied integrally in the at least one race plate and is comprised of the material forming the race plate.

15. The roller bearing according to claim 10, wherein the spring mechanism is located in a chamber formed between the at least one race plate and the receptacle in the guide rod in which the at least one race plate is positioned.

16. The roller bearing according to claim 10, wherein the spring mechanism is located in a chamber formed by the receptacle in the guide rod in which the at least one race plate is positioned and a recess in the at least one race plate.

17. The roller bearing according to claim 10, wherein the spring mechanism is a spring metal strip.

18. The roller bearing according to claim 10, wherein the spring mechanism is operatively associated with only one of the race plates.

19. A roller bearing for longitudinal motions, comprising:
    a sleeve part provided with a bore and possessing an inner surface;
    a guide rod with a circular cross-section positioned in the bore in the sleeve part, the guide rod possessing an outer surface;
    a plurality of uniformly distributed receptacles formed in either the outer surface of the guide rod or the inner surface of the sleeve part, the receptacles having a closed end wall;
    a plurality of race plates each disposed in one of the receptacles, the plurality of race plates being unconnected to one another;
    a plurality of roller bodies positioned between the guide rod and the sleeve part; and
    a spring element positioned between at least one of the race plates and the receptacle in which the at least one race plate is disposed to apply a spring force to the race plate urging the race plate in a radial direction away from the closed end wall of the receptacle.

20. The roller bearing according to claim 19, including a plurality of springs positioned between the at least one race plate and the receptacle in which the at least one race plate is disposed.

* * * * *